Patented Jan. 2, 1934

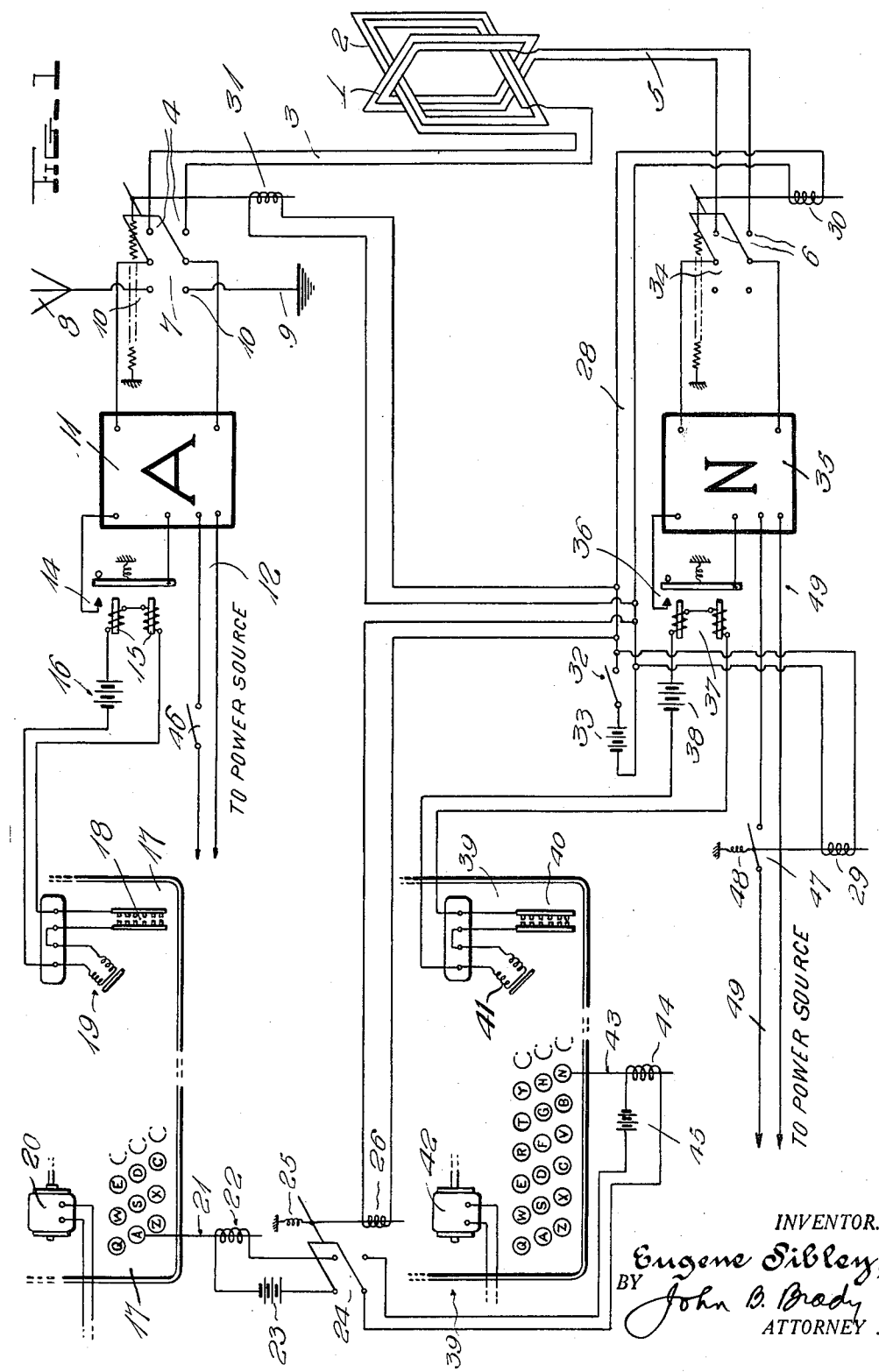

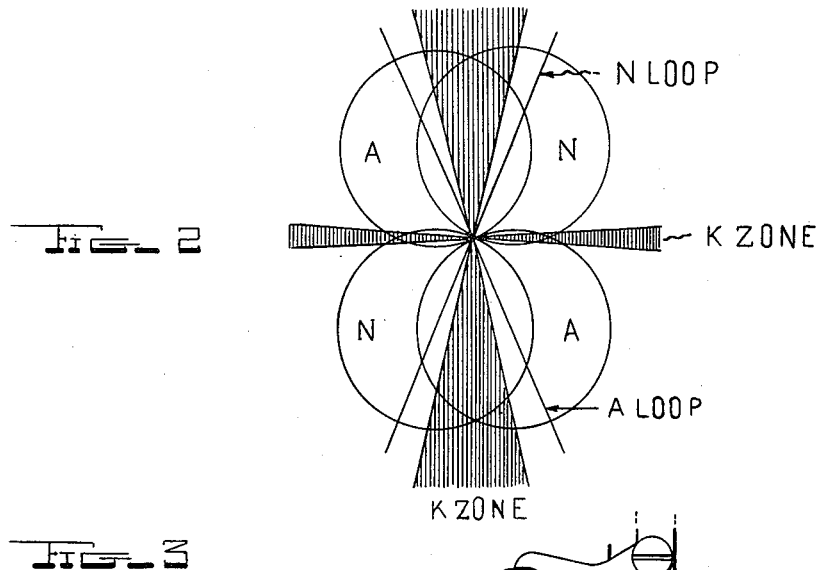
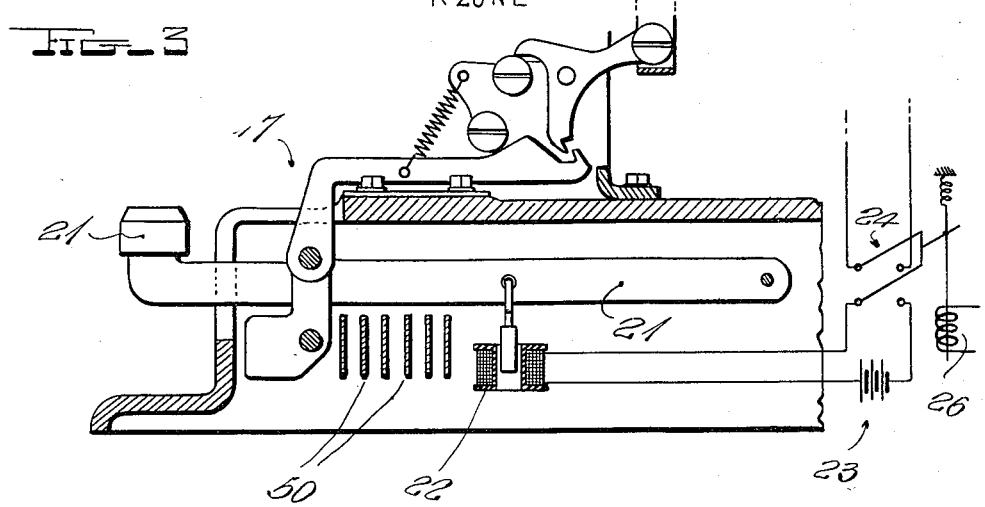

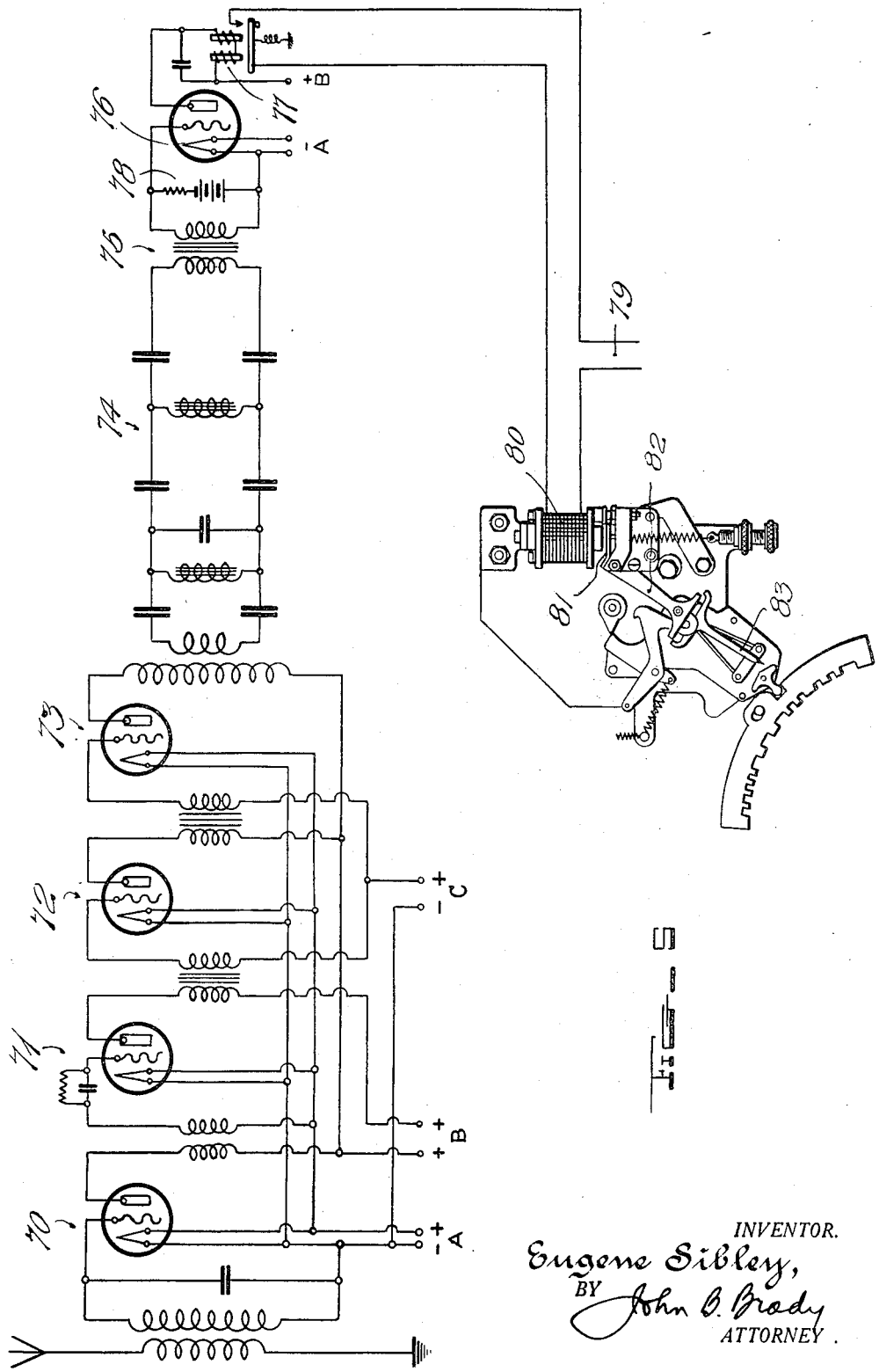

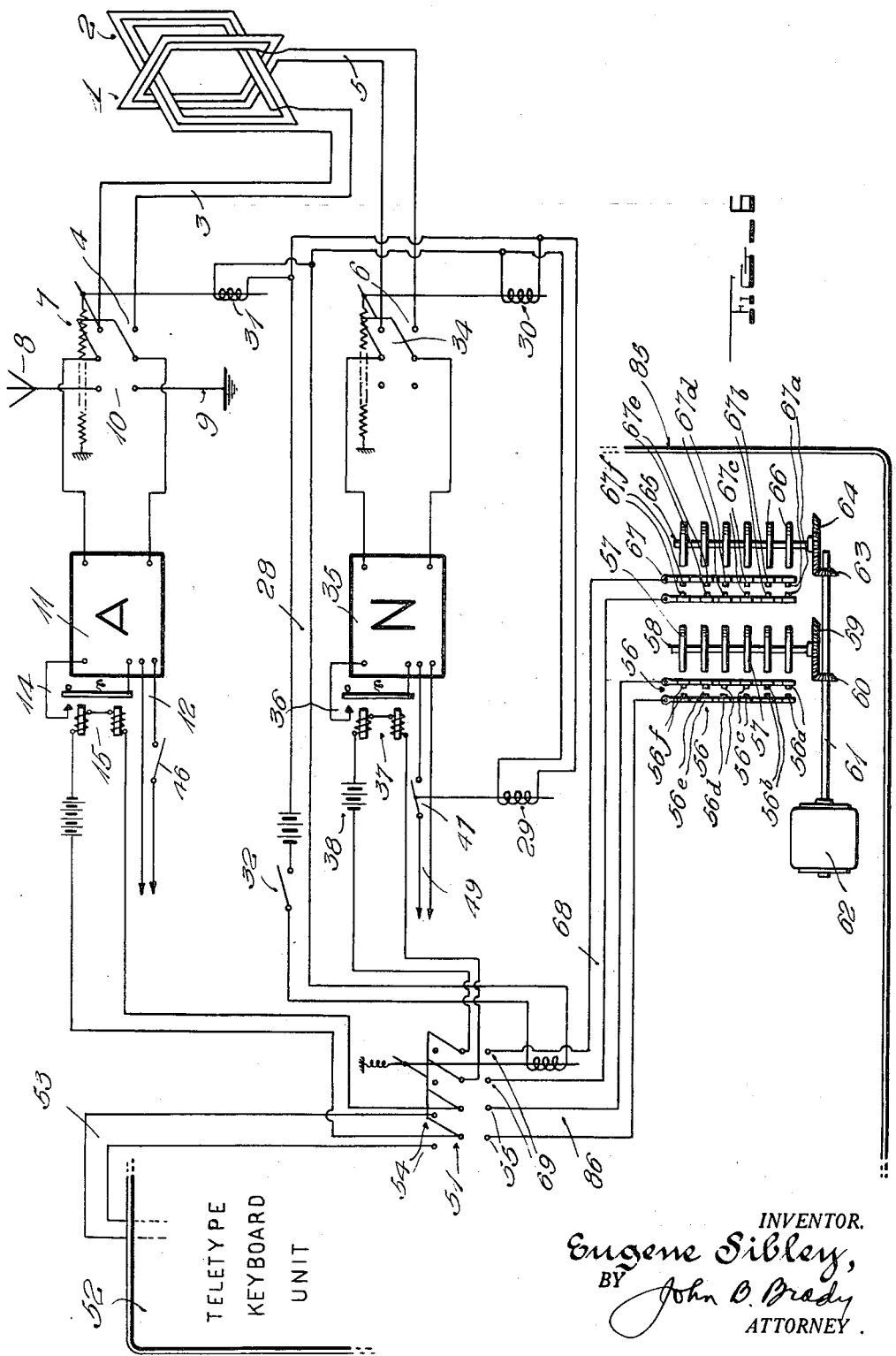

1,941,585

UNITED STATES PATENT OFFICE 1,941,585

RADIO BEACON SYSTEM

Eugene Sibley, Chevy Chase, Md.

Application February 1, 1930. Serial No. 425,237

9 Claims. (Cl. 250—11)

My invention relates broadly to radio beacon systems and more particularly to an automatic system of transmission and reception for radio beacon installations.

One of the objects of my invention is to provide an automatic radio beacon system whereby a pilot of a mobile vesssel may navigate a predetermined course according to a system of automatically operated printed characters.

Another object of my invention is to provide a system of automatic signal transmission for aircraft radio beacon systems employing a receiving apparatus on aircraft automatically operative upon the receipt of the transmitted signals for actuating a printing apparatus and giving printed indications to the pilot with respect to the direction of flight of the aircraft with respect to the beacon transmitter.

A further object of my invention is to provide a control circuit for aircraft radio beacon systems by which printer signals are transmitted along directional beams for actuating printing apparatus on aircraft for visually informing the pilot with respect to the direction of flight of the aircraft.

Still another object of my invention is to provide an automatic radio beacon system for air navigation in which interlocking automatic printer signals are transmitted on directional beams for cooperatively actuating an automatic printer system carried aboard aircraft for visually indicating to the pilot a predetermined course of safe flight.

A still further object of my invention is to provide an arrangement of automatic radio beacon system having means for directionally transmitting interlocking printer signals and non-directionally transmitting message signals in print for actuating printing telegraph apparatus carried aboard aircraft and indicating to the pilot the predetermined directional course of the radio beacon while warning the pilot with respect to weather conditions or imparting other information to the aircraft from the beacon station or from marker beacons along the line of flight.

Other and further objects of my invention reside in the circuit arrangement for the transmitting system by which printer signals may be directionally or non-directionally transmitted and received on aircraft in flight as set forth more fully in the specification hereinafter following by reference to the accompanying drawings, in which:

Figure 1 diagrammatically shows the radio beacon transmission system of my invention; Fig. 2 represents the character of radiation on the radio beacon paths and intermediate the directional zones of transmission; Fig. 3 is a schematic view showing the arrangement of transmitter control apparatus and the means for effecting successive transmission of signals representing a particular character or effecting transmission of automatic printer signals when interrupting the beacon signal for the transmission of messages; Fig. 4 is a pictorial representation of the kind of code arrangement of the signals transmitted on the radio beacon paths; Fig. 5 is a diagrammatic view representing the receiving apparatus and automatic printer equipment which is carried aboard the aircraft or mobile body in the radio beacon system of my invention; and Fig. 6 shows a circuit arrangement for the beacon station and the means for controlling the transmission of interlocking code signals according to the principles of my invention.

Heretofore in the art it has been proposed to guide aircraft by radio beacon systems modulated at different tone frequencies for effecting the vibration of differently tuned reeds carried by the aircraft for visually indicating to the pilot the relative position of the aircraft with respect to the beacons. This method of aircraft guiding has proved to be dangerous for an aircraft pilot has been inadverently lost from the radio beacon course and has flown on static by reason of the equal indication given by the static impulses on the vibrating reeds used as indicators when the pilot believed that he was flying directly on the course. It can readily be seen that with a vibrating reed type of indicator that the pilot may be informed of the relative position of the aircraft with respect to the directionally transmitted beacons modulated at different audio frequencies. However, when both frequencies are being received with equal intensity, the vibrating reeds are set into vibration as well as the modulated signaling energy and equal conditions of static in the reed control circuit may produce a result identical with conditions experienced when the aircraft is flying a predetermined course.

In my system of radio beacon and reception, I utilize an automatic printing telegraph apparatus known as the "Teletype" manufactured by Teletype Corporation, Chicago, Illinois. A light weight receiving tape Teletype machine has been developed and I employ this apparatus in the receiving circuit aboard the aircraft. This equipment is operated by the transmission of Baudot code signals from the beacon station. My system is, however, adapted to other types of automatic printing telegraph apparatus using the Baudot code or other similar code. The beacon station employs a pair of directional transmitting antennæ connected to separate transmitter circuits, the antennæ being electromagnetically switched into connection with the associated transmitters or disconnected therefrom under remote control as will be hereinafter more fully explained. At one of the transmitters, I provide a non-directional type of radiating system which may be electrically connected with the transmitting system when the transmitting system is disconnected from the directional antenna.

The automatic printing telegraph transmitting apparatus which is employed in the circuit arrangements of my invention at the transmitter includes connections for independently controlling each of the transmitting systems for directionally transmitting beacon signals on the directional radiating systems or disconnecting the directional radiating systems from the transmitting circuits and connecting the non-directional radiating system to one of the transmitters for the control of such transmitter for the transmission of printer signals when the beacon signals are interrupted. The aircraft beacon stations along the line of flight are in continuous operation and transmit the beacon signals for a predetermined period, which period of transmission is then interrupted and the keyboard operated for transmitting non-directionally the weather for each route converging on the beacon station and other information helpful to the pilot or messages intended for aircraft flying the airways. The automatic beacon signals are transmitted directionally while the weather information and broadcast signals are transmitted non-directionally. For example, an aeronautical radio station at the beacon terminal renders continuous service transmitting weather information for each route converging on the station each hour, and generally with a broadcast non-directionally each fifteen minutes in order to properly cover the routes. That is, at fifteen minutes after the hour, Cleveland would transmit weather information for the airway to Buffalo. Next, at thirty minutes after the hour, Cleveland would transmit weather information for the Louisville airway, etc. Between each broadcast and on the same frequency, directional Teletype signals are transmitted. That is, signals or characters are selected from the Baudot code in such manner that the impulses on the independent directional antennæ combine to form the impulses of a different signal or character. For example, after transmitting the Buffalo airway weather on a non-directional antenna under control of the transmitting Teletype apparatus, the transmitter circuits are connected to the directional antennæ and the non-directional antenna disconnected from the transmitting system. The letter A of the Baudot code is transmitted on one directional antenna while the letter N of the Baudot code is transmitted on the other directional antenna, both on the same radio channel and both characters being transmitted in the same time interval. That is, the unit times comprising the energized and deenergized intervals making up both letters commence and end simultaneously. The directional antennæ are disposed at a selected angle at the beacon transmitting station and operate to radiate maximum signals in a predetermined zone. A receiver carried aboard aircraft flying in the zone in which the code impulses representing the letter A is transmitted will record the letter A on an automatic printer. Aircraft flying in the zone through which the impulses representing the letter N is transmitted will record the letter N on the automatic printer receiver. The impulses of the Baudot code for the letters A and N are in such relation that if they are properly synchronized and if the receiving system on aircraft responds equally to both the A and N transmission, the signal resulting from the combined impulses is the letter K. There is, therefore, an intermediate zone between the zones in which the letters A and N are transmitted wherein the printed character K is actuated at the receiver. Therefore, the pilot must so maneuver the aircraft as to fly within the intermediate zone for receiving the printed character K. Any departure from the predetermined course will on the one hand bring in the signal A and on the other hand bring in the signal N. When the directional beams are interrupted, the directional antennæ are interchanged for the non-directional antenna and messages are broadcast under control of the printer keyboard bringing into action the corresponding type bars on the Teletype receiver printing apparatus which is carried by the aircraft. The guiding and communication system of my invention is wholly automatic and the cutting on or off of power to the transmitters and the exchange of the connections between the directional antennæ and the non-directional antenna are all subject to remote control from the beacon station.

Referring to the drawings in more detail, reference character 1 designates one of the directional antennæ on which the signal representing the letter N is radiated. Reference character 2 designates the directional antenna on which the signal designating the letter A is transmitted. The relationship of the directional antennæ 1 and 2 is shown more clearly in Figure 2. The non-directional antenna system is designated at 8 and 9. The switching system 7 is employed to change the connections from the output of transmitter or oscillation generator 11 to the directional antenna 2 through terminals 4 and leads 3, or to the antenna ground system 8—9 through the terminals 10. The switching system 7 is electromagnetically controlled from the beacon transmitter apparatus through the solenoid 31 and connections leading thereto from control circuit 28.

The directional antenna 1 connects through leads 5 to terminals 6 of switching system 34, which switching system is controlled by solenoid 30 connected to the remote control line 28. The output of transmitter 35 is connected to the switching system 34 and may be alternately connected to terminals 6 of directional antenna 1, or disconnected therefrom. The transmitter 11 is of the electron tube type including a constant frequency controlled oscillator and power amplifier system with a keying circuit diagrammatically shown at 14 and a power supply circuit which I have represented at 12. The power is cut on or off from the transmitter 11 through switching device 46. The keying circuit 14 is controlled through relay windings 15 and potential source 16 from the Teletype apparatus diagrammatically shown at 17. The Teletype apparatus includes a driving motor 20, a set of transmitting contacts 18, and a local Teletype printer receiving circuit which I have designated by the control magnet 19. The alphabetical and numerical keyboard has been schematically shown and for the purpose of explaining my invention I have shown the key lever for the letter A at 21 under control of the solenoid 22 which may be energized from battery system 23 by closing switch 24. When switch 24 is closed, the key lever 21 is held closed so that the transmission of A is repeated as driving motor 20 operates the transmitter contacts 18, transmitting the Baudot signal A consisting as represented in Fig. 4 of two signal intervals followed by three non-signal intervals. The transmitter or oscillation generator 35 is controlled by keying circuit 36 actuated by relay winding 37 receiving energy from battery 38 under control of the Teletype apparatus indicated at 39. The Teletype printer apparatus shown at 39 corresponds to the Teletype printer apparatus illustrated at 17 and includes transmitter contacts 40 which are series connected with the local Teletype printer receiver circuit 41 and connected to control the relay winding 37. The Teletype 39 includes the driving motor shown at 42 which is properly synchronized with driving motor 20. The keyboard of Teletype 39 contains the alphabetical and key levers as illustrated. The key lever N shown at 43 is provided with a solenoid control 44 including battery 45. When switch 24 is closed, battery 45 energizes solenoid 44 and holds key lever 43 closed, thereby repeating the signal N which is radiated from the directional transmitting antenna 1.

Power is supplied to transmitter 35 through circuit 49 which is provided with a circuit interrupter in the form of switch 47. Switch 47 is normally maintained in open position under the action of spring 48, but upon energization of solenoid 29 switch 47 is closed thereby placing transmitter or oscillation generator 35 in condition for operation. Solenoid 29 is connected to remote control circuit 28 which is supplied with energy from source 33 at the beacon station under control of switch 32. It will be observed that the remote control circuit extends to the solenoid 26 of switch 24, solenoid 31 of switching system 7, and solenoid 30 of switching system 34. Therefore, at the time that switch 32 is closed, switch 24 is closed for effecting a repeating action of the letters A and N to the relay circuits at the transmitters or oscillation generators 11 and 35, respectively, and the outputs of transmitters 11 and 35 are connected through switching systems 7 and 34, respectively, to the directional transmitting antennæ shown at 2 and 1 so that the system repeats the transmission of the Baudot characters A and N in the two diverging signal zones represented more clearly in Figure 2.

In Fig. 2, I have shown the arrangement of loops 1 and 2 in such angular relation that the directed transmission of signals A and N extend on opposite sides of the intermediate signal path in which the character K is transmitted so that the pilot in maneuvering with respect to the A and N signal transmission may fly a predetermined course in the K signal zone.

In Fig. 3, I have represented the keyboard arrangement at the beacon transmitter wherein the Teletype printer telegraph transmitter keyboard is designated at 17 housing a multiplicity of selector bars 50 which are actuated by endwise movement upon depression of the several key levers making up numbers and the alphabet. The letter A which is actuated by depression of key lever 21 may be repeated in the transmission system by energization of solenoid 22 as hereinbefore described which operates to hold down the lever 21 for the repeated transmission of the Baudot signal impulses representing the letter A.

The Baudot signaling code employed in the Teletype and other types of telegraph printers employ characters constituted by a five-unit code. If a given unit of time be divided into five intervals, during each of which current may or may not be transmitted, it is possible to produce thirty-two different combinations of energized and non-energized intervals. In this code, the letter A is represented by two energized intervals followed by three non-energized intervals. The letter E is represented by one energized interval followed by four non-energized intervals. The letter K is represented by four energized intervals followed by one non-energized interval. The letter N is represented by two non-energized intervals, followed in turn by two energized intervals and one non-energized interval. The code intervals or impulses corresponding to the letters A, N, K, are shown in Fig. 4. Each train of impulses representing a character is preceded by a synchronizing start impulse and followed by a stop impulse.

In Fig. 4, it will be seen that when the Baudot code signal impulses representing the letter A are combined with the Baudot code signal impulses representing the letter N that the result is a combination of impulses producing the Baudot character K. It is highly important that the initial moments of the code intervals forming the Baudot characters be the same for both the letters A and N in order that the impulses representing the letters A and N may be combined to produce the character K. I provide for this synchronized transmission in the initial installation of the Teletype equipment 17 and 39 at the transmitting station by the proper orientation of the impulse transmission mechanism.

In Fig. 5, I have shown the receiving apparatus which I employ in the automatic beacon system of my invention. For the purposes of illustration, I have shown the receiver constituting one stage of radio frequency amplification designated by reference character 70, a detector designated by reference character 71, and two stages of audio frequency amplification shown at 72 and 73. The output of the audio frequency amplification system may lead to a band pass filter 74 constituted by a multiplicity of frequency discriminating sections. The band pass filter selectively passes the particular modulation frequency which is automatically transmitted from the beacon station. It will be understood that only one carrier frequency is employed and that both paths of electromagnetic radiation are modulated at that frequency for which the band pass filter 74 is designed to operate. The output circuit of band pass filter 74 connects through output transformer 75 with the input circuit of relay 76 having in its output circuit the circuit closing relay 77. It will be understood that electron tube 76 is properly biased as represented at 78 so that a change in plate current is produced when voltage due to the incoming signal is applied to the grid. The circuit closing relay 77 has its contacts connected through direct current source 79 with the actuating windings 80 of the automatic printer which is carried aboard the aircraft. I have illustrated a portion of the mechanical actuating system of the automatic printer in order to clearly explain my invention. The actuating windings 80 operate armature 81 in accordance with Baudot code signals imparting movement to the armature extension 82 and operating the sword 83 and other parts of the printer mechanism for actuating a type bar and printing a character in accordance with the particular Baudot code signal which is transmitted. The printer receiver system is ideal for beacon operation in that there is no intermediate indication given by the printer receiver as the character received must be one of three letters, the letter which is produced when the aircraft is being guided on its proper predetermined course corresponding to a combination of the impulses of the other two characters.

In Fig. 1, I have illustrated a beacon transmission control system in which one of the key levers on the Teletype keyboard at the transmitter is maintained closed to produce the repeat signal character on each directed beam.

In Fig. 6, I have shown a method of coordinating the transmission of the Baudot printer signals on the separate beacon paths by means of a transmitter control unit shown at 85. On the transmitter control unit 85, I arrange a driving motor 62 which operates rotatable shaft 61 driving bevel gears 60 and 63 which mesh with bevel gears 59 and 64, each of which are secured to drive shafts 58 and 65. Each drive shaft carries a set of cams 57 and 66 which operate under rotative movement to close individual contacts of the sets of contacts 56 and 67. The set of contacts represented at 56 are fixed to control the circuit 86 for the transmission of the letter A in the Baudot five-interval code, as has been explained. That is, two impulses are transmitted by the closing of contacts 56a and 56b, and contacts 56c, 56d, and 56e are locked open. Contacts 56, therefore, control the transmission of the impulses corresponding to the letter A of the Baudot code. In the set of contacts 67, the contacts 67a and 67b are locked open while contacts 67c and 67d are free to periodically close in accordance with the driving action of the cams 66. Contacts 67e are locked open. Contacts 67, therefore, control the transmission of impulses corresponding to the letter N of the Baudot code. The contacts 56f and 67f are utilized for transmitting the start-stop impulse by which the transmitting and receiving Teletype apparatus is maintained in synchronism. That is to say, the Teletype receiving printer is not initiated into action for the recording of a succeeding character until all of the transmitting impulses of the energized and deenergized intervals for the preceding character have been actually transmitted. The arrangement of transmitters or oscillation generators 11 and 35 is similar to that described with reference to Fig. 1. In the control circuit, however, I provide a main switch system 51 which is four pole double throw. When thrown to a position where the switch blades connect contacts 55 and 69, the two transmitters are modulated through the circuits 86 and 68 to the sets of contacts 56 and 67 for the simultaneous transmission of the characters A and N. When the switch 51 is thrown to a position opening the circuit to contacts 55 and 69 and the circuit closed to the set of contacts 54, the circuit 53 which leads to the Teletype keyboard unit 52 becomes effective for the transmission of messages through transmitter 11 which is under these conditions connected to non-directional antenna 8—9. I provide the same type of remote control circuit for actuating the switch systems 7—34—51—47 as I have heretofore described in connection with Fig. 1 so that when switch 32 is closed, all of the operations for the several circuits will occur as explained in connection with Fig. 1. When the directional antennæ are connected to the transmitting apparatus, the Teletype control unit 85 transmits the Baudot characters A and N successively on the diverging beams. When it is desired to broadcast messages in print to aircraft or other stations, the non-directional antenna system is connected to one of the transmitters and the transmitter control unit 85 replaced by the Teletype keyboard 52.

The Teletype apparatus which may be employed as the printer apparatus in the beacon system of my invention is the invention of Charles L. Krum and Howard L. Krum of Chicago, Illinois. The Teletype apparatus is particularly described in Letters Patent No. 1,635,486, issued to these inventors July 12, 1927, based on application filed December 23, 1919, Serial No. 346,948. Some of the features of the Teletype employed in my system of aircraft navigation are described in H. L. Krum Patents No. 1,286,351 dated December 3, 1918, and No. 1,434,290 dated October 31, 1922. Reference is made to the aforesaid patents for the details of the Teletype, and it will be understood that the description given herein is general for the purpose of showing the application of printer apparatus to the beacon system of my invention.

My system of aircraft navigation also permits of the taking of bearings of the position of an aircraft such as a large plane or dirigible and other mobile craft with respect to one or more transmitters when the beacon is transmitting Teletype signals non-directionally. That is, the receiver may respond to the transmitted signals by the printing of characters on the maximum signal. This gives a direct indication of the bearing of the transmitter by actually printing the name or signals of the station at the receiver except at the minimum position of the loop receiver. By the usual triangulation methods the position of the receiver is determined. The timing of the Teletype lends itself to any method of direction finding which involves the time element in direction finding.

While I have described the invention in certain preferred embodiments, I desire that it be understood that modifications may be made and that no limitations upon my invention are intended other than are imposed by the scope of the appended claims.

What I claim as new and desire to secure by Letters Patent of the United States is as follows:

1. A combined beacon and communication system for aircraft comprising a pair of signal transmission channels, a pair of directive transmitting antennæ, an independent non-directive transmitting antenna, a pair of telegraphic printer transmitting keyboards each having a multiplicity of lettered and numbered transmission control keys and respectively controlling said transmission channels, a control circuit comprising means for simultaneously completing and maintaining in repeat position connections between selected control keys in each of said keyboards and each of said signal transmission channels and means for simultaneously interrupting the aforesaid connections and establishing connection between said independent non-directive transmitting antenna system and one of said signal transmission channels.

2. In a radio beacon system, a pair of keyboard impulse transmitters adapted to transmit trains of impulses corresponding in an equal interval code uniquely to selected characters by actuation of corresponding keys of said keyboard transmitters, means for holding depressed a key of each of said keyboard transmitters, said keys controlling the transmission of trains of impulses which are different from each other but when combined correspond in said code to a character different from both of the characters of said permanently depressible keys, a pair of directive antennæ adapted to transmit diverging beams, a pair of oscillation generators having their inputs respectively controlled by said keyboard transmitters and having their outputs respectively connected to said antennæ, and a mobile radio receiving station comprising a telegraph printer adapted to print characters when actuated by impulses initiated by said keyboard transmitters according to the code of said transmitters, whereby said printer will, according to the position of said mobile station relative to said beams, print the character corresponding to one of said permanently depressed keys or the character corresponding to the combination of the impulses of said permanently depressed keys.

3. In a radio beacon system, a pair of cam shafts, means for cooperatively driving said shafts synchronously, two sets of contacts respectively adjacent said shafts, a plurality of cams carried by each of said shafts and adapted to engage the set of contacts adjacent the respective shaft, a pair of directional antennæ adapted to radiate diverging beams, a non-directional antenna, a pair of oscillation generators, a keyboard impulse transmitter adapted to transmit trains of impulses corresponding in an equal interval code uniquely to selected characters by actuation of corresponding keys of said keyboard transmitter, a plurality of cooperatively actuated two-position switches adapted in one position to connect said non-directional antenna to the output of one of said generators and to connect the input of said generator to said keyboard transmitter and in the other position to connect the outputs of said generators respectively to said directional antennæ and to connect the inputs of said generators respectively to said sets of contacts, said sets of contacts being respectively arranged to control the transmission of trains of impulses which correspond to two different character keys of the code of said keyboard transmitter and which impulses when combined correspond to a third character key of the code of said keyboard transmitter, and a mobile radio receiving station comprising a telegraph printer adapted to print characters when actuated by impulses initiated by said keyboard transmitter or sets of contacts according to the code thereof.

4. In a radio beacon system, a pair of keyboard impulse transmitters adapted to transmit trains of impulses corresponding in an equal interval code uniquely to selected characters by actuation of corresponding keys of said keyboard transmitters, electromagnetic means for holding depressed a key of each of said keyboard transmitters, said keys corresponding to trains of impulses which are different from each other but when combined correspond in said code to a character different from both of the characters of said permanently depressible keys, a pair of directive antennæ adapted to transmit diverging beams, a pair of oscillation generators having their inputs respectively controlled by said keyboard transmitters, a non-directive antenna, a two-position electromagnetic switch system cooperatively actuated with said electromagnetic depressing means for in one position maintaining said depressing means in released position and connecting the output of one of said generators to said non-directive antenna, and in the other position maintaining said keys depressed and connecting the outputs of said generators respectively to said directive antennæ, and a mobile radio receiving station including a telegraph printer adapted to print characters when actuated by impulses initiated by said keyboard transmitters according to the code of said transmitters, whereby said printer will, according to the position of said mobile station with respect to said beams, print the character corresponding to one of said permanently depressed keys or the character corresponding to the combination of the impulses of said permanently depressed keys when said keys are depressed.

5. In a radio beacon system, a pair of keyboard impulse transmitters adapted to transmit trains of impulses corresponding in an equal interval code uniquely to selected characters by actuation of corresponding keys of said keyboard transmitters, electromagnetic means for holding depressed a key of each of said keyboard transmitters, said keys operating to effect the transmission of trains of impulses which are different from each other but when combined correspond in said code to a character different from both of the characters of said permanently depressible keys, a pair of directive antennæ adapted to transmit diverging beams, a pair of oscillation generators having their inputs respectively controlled by said keyboard transmitters, a non-directive antenna, a plurality of two position electromagnetic switches adapted in one position to connect the output of one of said generators to said non-directive antenna and in the other position to connect the outputs of said generators respectively to said directive antennæ, a common control circuit connected for cooperatively actuating said electromagnetic means and said electromagnetic switches for connecting the outputs of said generators to said directive antennæ when said keys are depressed and connecting the output of one of said transmitters to said non-directive antenna when said keys are released, and a mobile radio receiving station including a telegraph printer adapted to print characters when actuated by impulses initiated by said keyboard transmitters according to the code of said transmitters, whereby said printer will, according to the position of said mobile station with respect to said beams, print the character corresponding to one of said permanently depressed keys or the character corresponding to the combination of the impulses of said permanently depressed keys when said keys are depressed.

6. In an aircraft guiding system, a pair of angularly disposed directive antennæ for transmitting diverging beams of radio frequency energy, a transmitter for energizing each of said antennæ, a keying circuit for each of said transmitters, a non-directive antenna, a remote control switch for each of said directive antennæ, a printer keyboard, a remote control switch for said keyboard, a pair of circuit control units, an electromagnetic actuator individual to each of said remote control switches and a master control circuit connected with all of said electromagnetic actuators for controlling the operation of each of said remote control switches for selectively connecting said circuit control units respectively with the keying circuits of said transmitters and simultaneously connecting said transmitters with the respective directive antennæ and alternatively disconnecting the aforesaid connections and establishing connection between said printer keyboard and the control circuit of one of said transmitters and simultaneously establishing connection between the said transmitter and the non-directive antenna.

7. In a signaling system, a transmitter, a control keyboard including an alphabetical and numbered set of keys, a directive antenna and a non-directive antenna, and means connecting said keyboard with said transmitter for operation of any one of said alphabetical and numbered keys when said transmitter is connected with said non-directive antenna and means for interrupting the aforesaid operation and establishing connection between said directive antenna and said transmitter for the transmission of signaling energy under control of one of said keys.

8. In a beacon transmission system, a pair of directive antennæ systems disposed at angles to each other for emitting diverging beams of radio frequency energy, a nondirective signal emission system, separate transmission circuits, electromagnetically operated switches individual to each of directive and non-directive signal emission systems, repeat signal means for controlling each of said transmission circuits for repeatedly energizing said transmission circuits according to a repeating signal, and a master control circuit connected with all of said electromagnetically operated switches and having means therein for conditioning each of said transmission circuits for the directive transmission of energy through said directive transmission means under simultaneous control of said repeat signal means and alternatively disconnecting the circuits thus established and establishing connection between one of said transmission circuits and said non-directional signal emission system for the transmission of communication signals nondirectively.

9. In an aircraft guiding system, a pair of angularly disposed directive antennæ for transmitting diverging beams of radio frequency energy, a transmitter for energizing each of said antennæ, a keying circuit for each of said transmitters, a non-directive antenna, a remote control switch for each of said directive antennæ, a printer keyboard for controlling each of said keying circuits, means for electromagnetically controlling the operation of an individual key for each of said keyboards, a remote control switch for controlling the operation of each of said means, a master control circuit for controlling the operation of each of said remote control switches for selectively controlling the keying circuits of each of said transmitters by said individual keys while said transmitters are connected with said directive antennæ and alternatively disconnecting the aforesaid connections and establishing connection between one of said printer keyboards and said non-directive antenna for the transmission of communication signals.

EUGENE SIBLEY.